May 25, 1937.	P. SEEBER	2,081,681
CORN DETASSELING MACHINE
Filed July 23, 1936    2 Sheets-Sheet 1
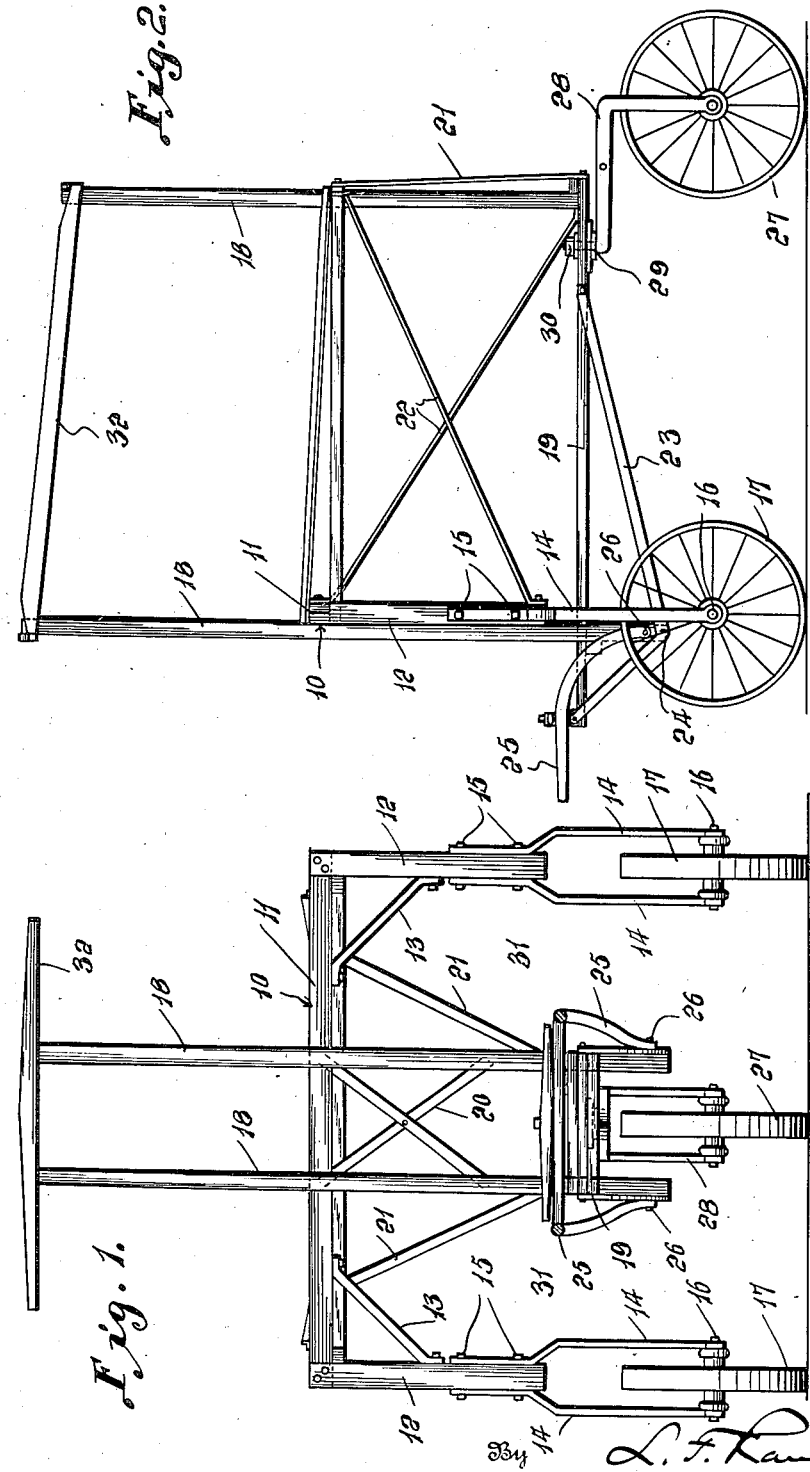

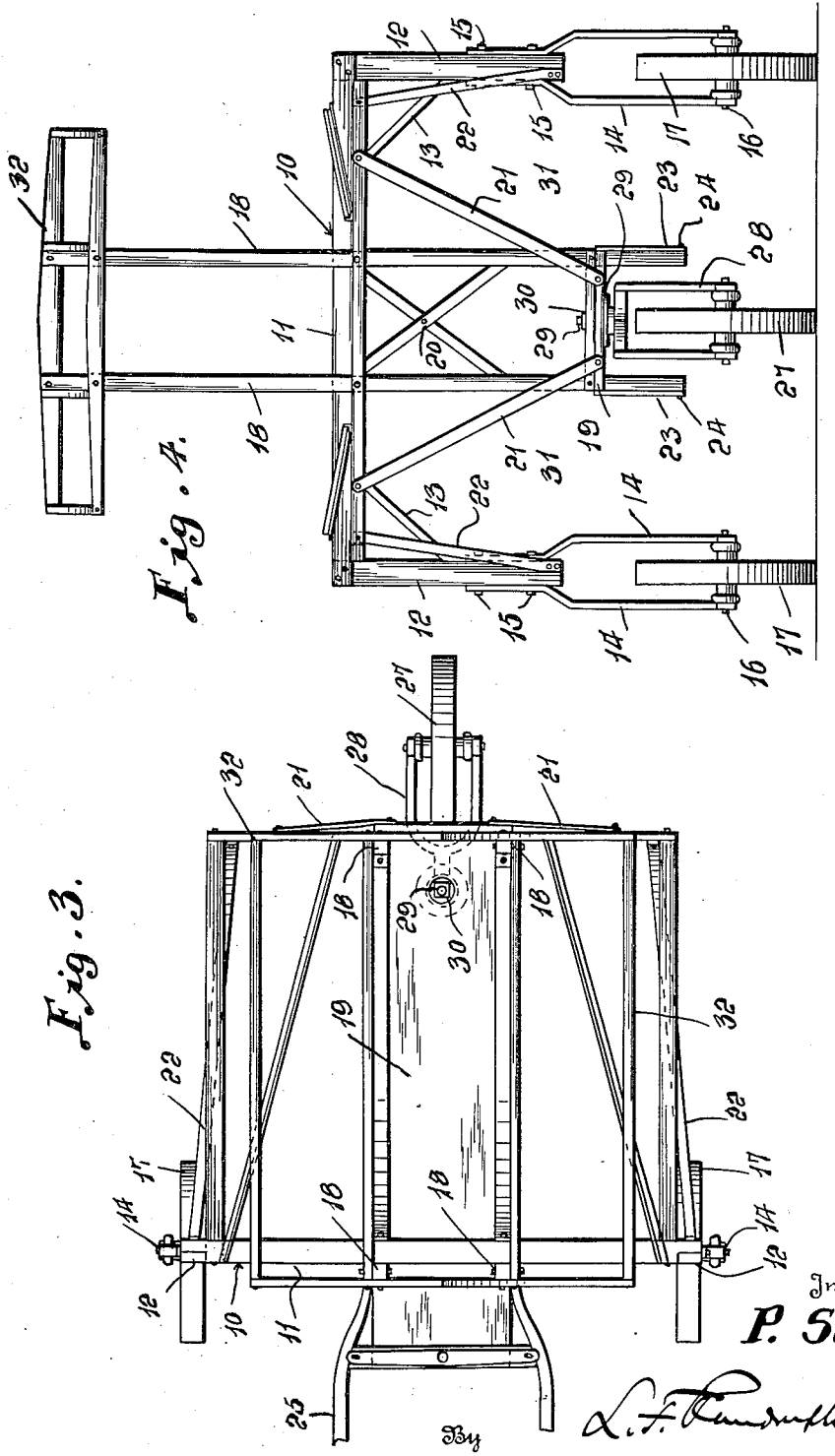

Patented May 25, 1937

2,081,681

UNITED STATES PATENT OFFICE 2,081,681

CORN DETASSELING MACHINE

Peter Seeber, Champaign, Ill.

Application July 23, 1936, Serial No. 92,206

3 Claims. (Cl. 280—29)

This invention relates to a machine or vehicle for use in the removal of tassels from corn as a step in the growing of hybrid seed corn, the machine providing a platform at the desired elevation for the workmen to stand upon so as to conveniently observe the top of the corn, reach and remove the tassels.

The invention resides in the various combinations and details of construction which will hereinafter be pointed out or otherwise become apparent from a consideration of the description following taken in connection with accompanying drawings illustrating an operative embodiment.

In said drawings:—

Figure 1 is a view of the machine in front elevation;

Figure 2 is a view thereof in side elevation;

Figure 3 is a top plan view, and

Figure 4 is a rear view in elevation.

Referring specifically to the drawings wherein like reference characters designate like or similar parts, 10 designates a suitable skeleton framework having an elevated horizontal framework section 11 higher than the corn from which the tassels are to be removed. Depending from the portion 11 are uprights 12, suitably braced as at 13 which have hanger brackets 14 adjustably connected thereto as by means of bolts or the like 15. The hanger brackets 14 mount the axles 16 on which forward wheels 17 are journaled.

Disposed equidistantly from the sides of the machine are posts or uprights 18 to which a central platform 19 is secured and upon which the workmen are adapted to stand to remove the tassels from corn over which the machine is moved.

Various braces at 20, 21 and 22, rigidify the connection of the platform to the framework.

Said platform 19 extends forwardly of the posts or uprights 18 and it is further braced by V-shaped braces 23 also connected at 24 to the posts 18. Draft shafts 25 may be pivoted at 26 to the posts 18, affording a means whereby animal power may be used to draw the machine over the field. Such draft means is to be taken as one example only since the machine may be equipped with a motor and be self-propelled.

A central rear wheel 27 is provided for engagement with the ground, being mounted in an L-shaped hanger 28 having a stud 29 swiveled or journaled on a vertical axis in the rear portion of the platform 19, and preferably detachably connected as by means of a bolt at 30. Since the rear wheel 27 is thus mounted to swivel, it constitutes a steering wheel. If desired, any suitable means may be employed to positively steer the wheel 27.

The structure provides a pair of arches having spaces as at 31, so that the wheel 27 may travel between two rows of corn and two more rows of the corn will be received in the spaces 31, that is two rows of the corn in each space 31, so that the workmen on the platform 19 may efficiently remove the tassels from the corn as the machine progresses.

Since the posts 18 extend upwardly above the horizontal portion 11, they are used to mount a suitable frame or support 32 for a canopy or sunshade over the workmen.

Various changes may be resorted to provided they fall within the spirit and scope of the invention.

I claim as my invention:—

1. A detasseling machine having a horizontal platform upon which workmen are adapted to stand, a ground wheel in line with said platform, means swiveling the ground wheel to the platform, a skeleton framework including posts disposed in upright relation to the platform adjacent the corners thereof, said wheel being at the rear of the machine, a crossbeam above the platform disposed in transverse relation to the posts at the front of the machine, uprights depending from opposite ends of the crossbeam in spaced relation to the platform, hanger brackets depending from said uprights, ground wheels mounted by said hanger brackets in laterally spaced relation to the platform.

2. A detasseling machine having a horizontal platform upon which workmen are adapted to stand, a ground wheel in line with said platform, means swiveling the ground wheel to the platform, a skeleton framework including posts disposed in upright relation to the platform adjacent the corners thereof, said wheel being at the rear of the machine, a cross beam above the platform disposed in transverse relation to the posts at the front of the machine, upright depending from opposite ends of the crossbeam in spaced relation to the platform, hanger brackets depending from said uprights, ground wheels mounted by said hanger brackets in laterally spaced relation to the platform, the last mentioned posts extending below the platform, and draft means connected to the last mentioned posts below the platform.

3. A detasseling machine having a horizontal platform upon which workmen are adapted to stand, a ground wheel in line with said platform, means swiveling the ground wheel to the platform, a skeleton framework including posts disposed in upright relation to the platform adjacent the corners thereof, said wheel being at the rear of the machine, a crossbeam above the platform disposed in transverse relation to the posts at the front of the machine, uprights depending from opposite ends of the crossbeam in spaced relation to the platform, hanger brackets depending from said uprights, ground wheels mounted by said hanger brackets in laterally spaced relation to the platform, said posts extending above the crossbeam, and supporting means for a canopy mounted by said posts.

PETER SEEBER.